Sept. 28, 1926.
F. TIEMANN
HOE
Filed Feb. 12, 1926
1,601,382
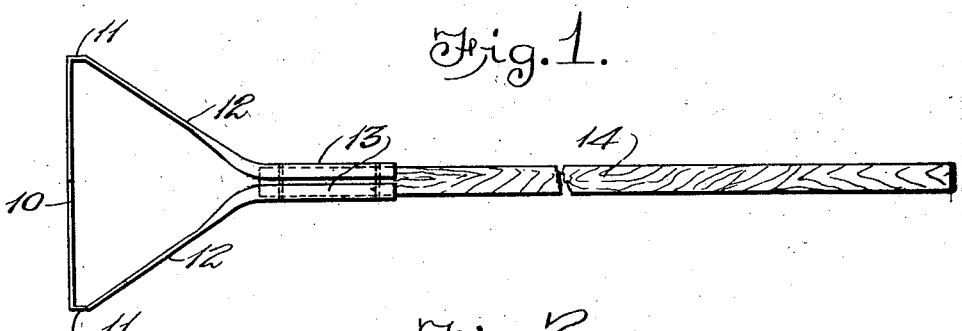
Fig. 1.
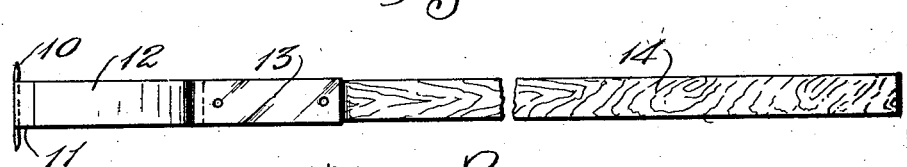
Fig. 2.
Fig. 3.
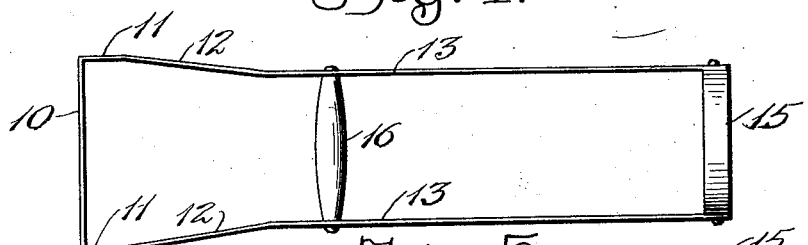
Fig. 4.
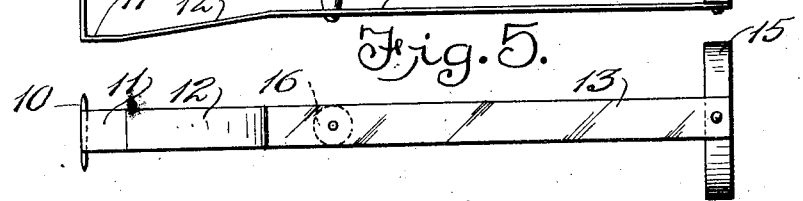
Fig. 5.
Fig. 6.
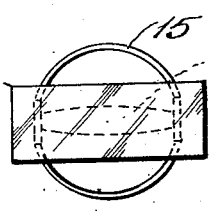
Inventor
Frederick Tiemann,
L. N. Gillis
Attorney Patented Sept. 28, 1926.

1,601,382

UNITED STATES PATENT OFFICE.

FREDERICK TIEMANN, OF ORDWAY, COLORADO.

HOE.

Application filed February 12, 1926. Serial No. 87,905.

This invention relates to agricultural implements and has special reference to a garden hoe.

More particularly the invention relates to certain improvements in the weeding hoe shown in my prior Patent No. 1,505,173 which was issued to me the 19th day of August, 1925.

Experience has disclosed that the construction shown in the aforesaid prior patent is somewhat expensive to manufacture owing to the tubular conical socket arrangement and also that such a hoe is capable of being improved for use as a short one hand device.

The principal objects of the present invention are to provide a device of this character wherein the main part or head of the invention may be manufactured from a single strip of metal, steel being ordinarily used, in a manner more economical than that shown in my prior patent, and also to provide a construction especially adapted for a one handed implement of this class.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of one form of the invention.

Figure 2 is a side elevation thereof.

Figure 3 is an end view thereof.

Figure 4 is a plan view of a second form of the invention.

Figure 5 is a side elevation of the second form.

Figure 6 is an end view of the second form.

In each form here illustrated the main part or head of the implement is made from a single strip of metal so formed as to provide a transversely extending portion 10 and at each end of the portion 10 is a rearwardly extending portion 11, the portions 10 and 11 being sharpened on each edge to provide cutting edges. From the rear ends of the portions 11 extend converging portions 12 to terminate rearwardly in parallel extremities 13. In the first form these extremities are shaped in cross section to conform to the rectangular handle or support 14.

In the second form the extremities are secured to a support 15 in the form of an arm ring, a hand grip 16 being carried between the parallel portion 13 adjacent the forward ends thereof.

In the first form the device is used with one or both hands as an ordinary hoe is used but in the second form one hand is slipped through the ring 15 and the grip 16 is grasped by that hand, the ring 15 surrounding the forearm of the user just below the elbow. It is obvious that this ring may be suitably padded to obtain the proper fit on the arm if necessary.

There has thus been provided a simple and efficient device of the kind described and for the purpose specified.

Having thus described the invention, what is claimed as new, is:

A hoe including a single strip of metal formed to provide a transversely extending central blade portion, the remaining portions of the strip extending rearwardly from the ends of said blade portion, an arm ring located at the extremities of the strip and secured thereto, and a hand grip extending between the rearwardly extending strip portions and secured thereto in spaced relation to the arm ring.

In testimony whereof I affix my signature.

FREDERICK TIEMANN.